US012325197B2

(12) United States Patent
Montero Perez et al.

(10) Patent No.: US 12,325,197 B2
(45) Date of Patent: Jun. 10, 2025

(54) METHOD FOR MANUFACTURING A SLAB OF ARTIFICIAL AGGLOMERATED STONE

(71) Applicant: Cosentino Research & Development, S.L., Almeria (ES)

(72) Inventors: Carmen Maria Montero Perez, Almeria (ES); Maria Jesus Ayuso Sanchez, Almeria (ES); Pablo Caramazana Gonzalez, Almeria (ES); Salvador Rodriguez Garcia, Almeria (ES); Samuel Garcia Higuera, Almeria (ES)

(73) Assignee: Cosentino Research & Development, S.L., Almeria (ES)

( * ) Notice: Subject to any disclaimer, the term of this patent is extended or adjusted under 35 U.S.C. 154(b) by 35 days.

(21) Appl. No.: 18/063,697

(22) Filed: Dec. 9, 2022

(65) Prior Publication Data

US 2023/0182404 A1    Jun. 15, 2023

(30) Foreign Application Priority Data

Dec. 10, 2021 (EP) .................................... 21383125

(51) Int. Cl.
*B29C 67/00* (2017.01)
*B29C 39/12* (2006.01)
(Continued)

(52) U.S. Cl.
CPC .......... *B29C 67/0007* (2013.01); *B29C 39/12* (2013.01); *B29K 2033/04* (2013.01);
(Continued)

(58) Field of Classification Search
CPC ... B29C 67/0007; B29C 39/12; B28B 13/021; B28B 13/0295
See application file for complete search history.

(56) References Cited

U.S. PATENT DOCUMENTS

2015/0360507 A1* 12/2015 Benito Lopez ......... C04B 26/14
                                                                  428/15
2017/0355101 A1* 12/2017 Toncelli ............... B28B 13/0295
(Continued)

FOREIGN PATENT DOCUMENTS

CN          107745541 A         3/2018
EP          3593968 A1 *        1/2020
(Continued)

OTHER PUBLICATIONS

International Search Report for PCT/EP2022/085087, dated Mar. 21, 2023.
(Continued)

*Primary Examiner* — Virak Nguon
(74) *Attorney, Agent, or Firm* — Finnegan, Henderson, Farabow, Garrett & Dunner LLP (57) ABSTRACT

The present disclosure is related to a method for manufacturing slabs of artificial agglomerated stone comprising:
  depositing a first layer (1.1) of a first mixture ($M_1$) onto a surface (2), wherein the first layer having a first thickness $h_1$,
  creating at least one cavity (3), having a width $w_i$ and a length $L_i$, in the first layer (1.1) of first mixture ($M_1$),
  depositing a second mixture ($M_2$) into the at least one cavity (3) of the first layer (1.1), forming a second layer (1.2) by depositing the first and second mixtures, and the second layer having a second thickness $h_2$,
  compacting and hardening the second layer (1.2),
wherein the method further comprises after step c) and before step d),
  inserting a first tool (5) at least partially into the second thickness $h_2$ of the second layer (1.2), and
(Continued)

actuating the first tool (5) wherein the first tool (5) is configured to stir the first wall portion (4.1) while not stirring the second wall portion (4.2).

18 Claims, 6 Drawing Sheets

(51) Int. Cl.
  *B29K 33/04*     (2006.01)
  *B29K 509/00*    (2006.01)

(52) U.S. Cl.
  CPC .. *B29K 2509/14* (2013.01); *B29K 2995/0021* (2013.01); *B29K 2995/0029* (2013.01)

(56) References Cited

U.S. PATENT DOCUMENTS

| | | |
|---|---|---|
| 2019/0105800 A1 | 4/2019 | Xie |
| 2019/0283270 A1 | 9/2019 | Grzeskowiak, II et al. |
| 2021/0268686 A1* | 9/2021 | Tarozzi ............... B28B 1/005 |
| 2022/0097258 A1* | 3/2022 | Toncelli ............. B28B 13/0295 |

FOREIGN PATENT DOCUMENTS

| | | | |
|---|---|---|---|
| WO | WO-2019101823 A1 * | 5/2019 | ............. B28B 1/005 |
| WO | WO-2021019020 A1 * | 2/2021 | ........... C04B 14/041 |

OTHER PUBLICATIONS

European Search Report issued in Application No. 21383125.8, dated May 23, 2022.

* cited by examiner

METHOD FOR MANUFACTURING A SLAB OF ARTIFICIAL AGGLOMERATED STONE

This application claims priority to European Application No. EP21383125.8, filed Dec. 10, 2021; the content of this application is incorporated herein in its entirety.

The present disclosure is related to a method for manufacturing slabs, tiles or sheets of artificial agglomerated stone with a novel chromatic effect obtained from at least two different mixtures, with at least one cavity by, among others, a tool configured to stir a portion of the at least one cavity. Also, the present disclosure is related to the slabs, tiles or sheets of artificial agglomerated stone directly obtained by the above-mentioned method.

The disclosure falls in the field of materials for construction, decoration, and architecture, made of artificial stone, as well as to their manufacture and fabrication. For example, the disclosure is done within the technological area of artificial agglomerated stone slabs having chromatic effects and decorations, used as surfaces for counters, kitchen tops, sinks, shower trays, wall cladding, flooring, or the like.

Artificial agglomerated stone slabs, tiles or sheets frequently simulate natural stones and are common in the construction, decoration, architecture, and design sectors. The habitual processes for manufacturing theses slabs, tiles or sheets at industrial scale are well established nowadays.

One of the most popular artificial stone materials and highly appreciated for their aesthetic, hardness and resistance to staining and wear, are the so-called quartz agglomerated surfaces or engineered stone surfaces. These stone materials are extensively used for countertops, claddings, floorings, sinks and shower trays, to name a few applications. Also, they can be more generally called artificial agglomerated stones. Their applications partially overlap with the applications of natural stones such as marble or granite.

Artificial agglomerated stones can be made simulating colors and patterns in natural stone or they might also have a totally artificial appearance, e.g., with plain bright red or fuchsia colors. The basis of their composition and the technology currently implemented for manufacturing the artificial agglomerated stones dates back from the late 1970s, as developed by the company Breton SpA which is nowadays commercially known in the sector under the name Bretonstone®.

General concepts of the manufacturing of artificial agglomerated stones are disclosed, for example, in the patent document U.S. Pat. No. 4,204,820A. In the disclosed production process, inorganic (stone, mineral or synthetic) granulates and powders—commonly quartz, synthetic cristobalite and/or other mineral granulates—having varied particle sizes, are firstly mixed with a hardenable binder, frequently a liquid organic resin. The resulting mixture is homogenized and distributed into a temporary mold or alternatively onto a sheet of paper, where it is then compacted by vibro-compaction under vacuum and subsequently hardened.

Recently, there has been an increasing demand for this type of products, in particular the versions which are imitations of natural marble slabs. Some of those marble slabs, such as Calacatta or Statuario, are characterized by having relatively wider veins of a material of different color than the background material, showing veins which extend through different distances in the length and/or the width of the slab, and which are visible partially or fully through the thickness of the slab.

In order to simulate the appearance of these natural materials, the common approach has been to use different types of pigmented (unhardened) mixtures, which before compaction and hardening steps, are distributed forming separately either the vein or the background component of the slab. Most relevant publications in this field describing different strategies for achieving simulation of natural material appearance are the following:

WO 2014108582 A1 relates to articles that comprise an agglomerate of artificial stone and polymerisable resin, such as tiles or slabs, to be used as a construction material, characterized in that they comprise various large strati or veins having a heterogeneous variable adjustable directions and dimensions, which provide a specific aesthetic appearance similar to natural stone products.

WO 2016123433 A1 describes systems and processes for forming synthetic mold slab products, for example, a synthetic mold slab that is compacted to a selected slab shape from a plurality of different mixtures including particulate mineral material, resin binder, and pigments so that the synthetic molded slab has a veined appearance and is suitable for use in living or working spaces.

WO 2016189377 A1 discloses manufacturing artificial stone slabs comprising veins, for example imitating marble slabs, by means of combining at least two moldable hardenable fluid mixtures of a first material and a second material having different colors, the two materials being combined following a predefined precise pattern coinciding with a pattern of thin veins to be obtained.

WO 2019101823 A1 relates to a method and a system for producing slabs, tiles or sheets of artificial stone, with a wide vein effect, which comprise at least two mixtures of inorganic particles of different sizes and hardened binders, and which simulate the veined appearance that some types of natural stone have.

WO 2020115644 A1 describes the formation of veining in slabs, such as made of conglomerate stone and/or ceramic material. According to the disclosure of this document, it relates firstly to a method for manufacturing slabs of conglomerate stone and/or ceramic material with a veined effect. Secondly, it relates to a robot island for the formation of veining in a base mix for manufacturing slabs of conglomerate stone and/or ceramic material. Thirdly, it relates to an apparatus for manufacturing slabs of conglomerate stone and/or ceramic material with a veined effect.

WO 2021070030 A1 and WO 2021064627 A1 both relates to a process and equipment for the manufacture of slabs of ceramic and/or stone material presenting veins of different color compared to the base material.

Consumers have different preferences regarding the final appearance of artificial agglomerated stone slabs. While some of them would appreciate artificial stones which are as close imitation of natural materials as possible, others would prefer other chromatic combinations or effects.

Starting from the known art, the disclosure seeks to propose an original method to produce artificial agglomerated stone slabs, in an industrial efficient and highly reproducible way, resulting in new types of chromatic effects that, without being imitations of natural stones, still maintain some resemblance to, and therefore also the appeal of, the patterns found in natural marble and other veined stone materials.

The present disclosure disclosed herein is based on the inventors surprising finding, departing from the typical veined effects of natural stones and their known methods of manufacture, and aiming to achieve chromatic effects not found in nature, that products of high appeal can be obtained incorporating veining with some degree of controlled randomness and intentional visual asymmetry of color gradients. These effects can be created extending at least partially through the thickness of the slab and are thus also visible in the edges of the slab, and in the new edges created when the slab is cut-to-size for the intended application.

The present disclosure provides a solution for the above mentioned issues by a method for manufacturing slabs, tiles or sheets of artificial agglomerated stone according to independent claim 1. In dependent claims, embodiments of the disclosure are defined.

The present disclosure provides a method for manufacturing a slab of artificial agglomerated stone which comprises the following steps:
  a) depositing a first layer of a first mixture onto a surface, wherein the first layer has a first thickness $h_1$,
  b) creating at least one cavity, having a width $w_i$ and a length $L_i$, in the first layer of first mixture, wherein the at least one cavity is defined by at least one cavity wall extending at least partially through the first thickness $h_1$ of the first layer and comprising a first wall portion and a second wall portion in opposition through the at least one cavity width $w_i$,
  c) depositing a second mixture into the at least one cavity of the first layer, forming a second layer by depositing the first and second mixtures, and the second layer having a second thickness $h_2$,
  d) compacting and hardening the second layer,
wherein the method further comprises after step c) and before step d),
  inserting a first tool at least partially into the second thickness $h_2$ of the second layer, and
  actuating the first tool wherein the first tool is configured to stir the first wall portion while not stirring the second wall portion.

The index i of the terms $w_i$ and $L_i$ respectively referring to the width of the cavity i of the at least one cavity and the length of the cavity i of the at least one cavity can take any whole number from 1 upwards. Consequently, $w_1$ and $L_1$ would refer to the width of the cavity 1 and the length of the cavity 1, $w_2$ and $L_2$ would refer to the width of the cavity 2 and the length of the cavity 2 and so on for the following values of the index i.

Throughout the whole document, the term agglomerated stone or artificial agglomerated stone refers at least to all materials included in the definition contained in European standard EN-14618:2009.

Throughout the whole document, the length $L_i$ of the at least one cavity is the line corresponding to the average line or direction of the at least one cavity, that is to say, the average line which points are equidistant to opposed wall portions of the at least one cavity walls.

Further, throughout the whole document, the width $w_i$ of the at least one cavity shall be the distance between the first wall portion and the second wall portion along a line perpendicular to the average line or direction of the at least one cavity. The width $w_i$ of the at least one cavity is variable depending on the point of the average line or direction selected.

Thus, both first and second wall portions are wall portions of the at least one cavity opposed along a width of the at least one cavity $w_i$.

Also throughout the whole document, by the first wall portion and the second wall portion being in opposition through the at least one cavity width $w_i$, the present disclosure refers to any type of cavity shape which is defined by two portions distant one from the other by a distance being the at least one cavity width $w_i$. In case of certain cavities having a vein shape, the first wall portion and the second wall portion extend through the length $L_i$ along the line of the vein, where the first wall portion and the second wall portion may converge into two points, each one at an end of the length $L_i$ of the at least one cavity, or they might end at edges of the first or second layers.

Figure 1A:
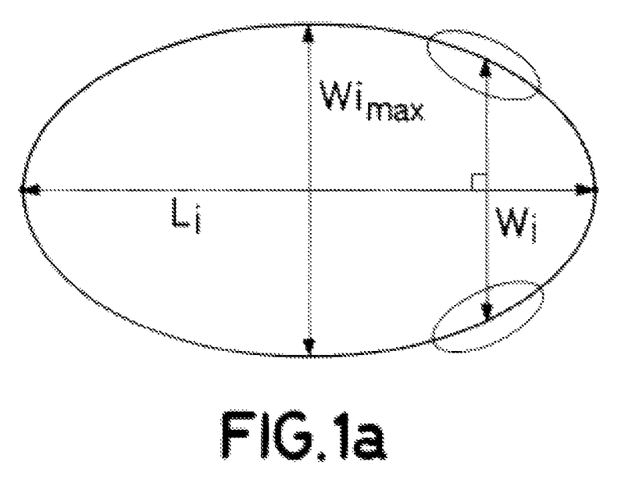
FIGS. 1a, 1b These figures show two embodiments of the shape of the cavity according to the disclosure.

In case of elliptical shaped cavities, as shown in FIG. 1a, it is understood that the major axis of the elliptical shaped cavity crosses the perimeter of the cavity in two points distant along the length $L_i$ of the cavity. One region of the perimeter, represented as a circled area in FIG. 1a, defines a first wall portion and its corresponding opposite circled area is symmetrical with respect to the major axis which defines a second wall portion. For example, the first wall portion is the wall which is about to be stirred as claimed by the present disclosure. The distance in between the first wall portion and its opposite wall portion, the second wall portion, defines the at least one cavity width $w_i$ which is perpendicular to the major axis of the elliptical shaped cavity, that is the length $L_i$. Further for example, the cavity width $w_i$ is perpendicular to the length $L_i$ of the cavity and such cavity width $w_i$ is variable along the length $L_i$ up to $w_{imax}$ where $w_{imax}$ is the minor axis of the elliptical shaped cavity.

Figure 1B:
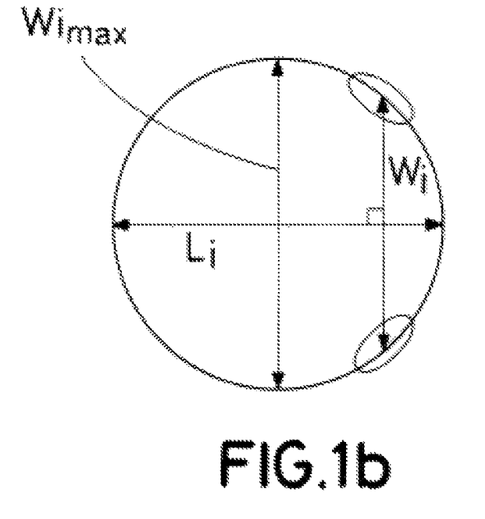

In case of a circle shaped cavity, as shown in FIG. 1b, it is understood that a diameter of the circle shaped cavity defines the length $L_i$ of the cavity. One region of the perimeter of the circle shape cavity, represented as a circled area in FIG. 1b, defines a first wall portion and its corresponding opposite circled area is symmetrical with respect to the length $L_i$ which defines a second wall portion. As above mentioned, for example, the first wall portion is the wall which is about to be stirred as claimed by the present disclosure. The distance in between the first wall portion and its opposite wall portion, the second wall portion, defines the at least one cavity width $w_i$. Further for example, the cavity width $w_i$ is perpendicular to the length $L_i$ of the cavity and such cavity width $w_i$ is variable along the length $L_i$ up to $w_{imax}$ where $w_{imax}$ is equal to another diameter of the circle shaped cavity also perpendicular to the length $L_i$.

The artificial stone is, for example, in the form of a slab and the term slab shall be understood to cover also tile, sheet, plank, board, or plate. Moreover, the term slab covers artificial stone blocks which have a major dimension of at least 20 times its thickness.

In an embodiment, the dimensions of the agglomerated stone slab is at least 1500 mm in length, at least 1000 mm in width and 4 to 40 in thickness; such as 200 mm to 3500 mm in length, 1000 mm to 1800 mm in width and 4 mm to 40 mm in thickness.

The method of the first aspect of the disclosure comprises the step of depositing a first layer of a first mixture onto a surface and another step of depositing a second mixture into cavities previously created in the first layer of the first mixture to form a second layer as the combination of the first and second mixtures.

At least one cavity is created in the first layer of the mixture. For example, a plurality of cavities are created in the first layer of first mixture. The at least one cavity being defined by at least one cavity wall as the boundary between the first mixture and the at least one cavity space. Also, the at least one cavity is defined by its width $w_i$ and its length $L_i$ where the width $w_i$ is the shortest distance between a first wall portion and a second wall portion, both first and second wall portions being opposed wall portions of the at least one cavity wall.

The first and/or the second wall portion of the at least one cavity extends at least partially through the first thickness $h_1$ of the first layer. In some embodiments, the first and/or the second wall portion of the at least one cavity extends fully through the first thickness $h_1$ of the first layer. The wall portions of the at least one cavity might have a general planar direction parallel or relatively inclined with respect to the first layer thickness $h_1$ direction.

The first mixture forms a first layer onto the surface, having a first thickness $h_1$. This first thickness $h_1$ shall be understood as the maximal thickness of the first layer, and it is defined as the dimension of the layer thickness $h_1$ measured from the surface where it is deposited, in the direction perpendicular to it, until the part of the first layer most distal from the surface.

In some embodiments, the first thickness might range from 8 cm to 0.5 cm, or from 6.0 cm to 0.5 cm.

The at least one cavity comprises two opposed wall portions, understood as portions of the at least one cavity wall opposed through the cavity width $w_i$. These two wall portions might be from the same cavity wall, or they could be from different cavity walls defining the same cavity.

The at least one cavity in the first layer comprises a first and a second wall portions which are in opposition through the cavity width $w_i$. The first tool, once it is inserted into the second layer, is actuated to stir one of the two opposing wall portions—the first opposing wall portion—while not stirring the other wall portion—the second opposing wall portion, that is to say, the first tool is actuated to stir only one of the two opposing wall portions. In this manner, the first mixture of the first layer and the second mixture of the second layer are intermingled in this portion or area.

The second opposing wall portion remains unaffected while the stirring of the first opposing wall portion occurs. The action of the first tool results in the intermingling of the first and second mixtures in areas where the first opposing wall portion is present. This is in contrast with the second opposing wall portion, which is not stirred, and which maintains a higher definition of the boundary between the first and second mixtures.

The first opposing wall portion being stirred might have any length or dimension, and it, for example, comprises a portion of the at least one cavity wall length. The first and/or second opposing wall portions may comprise the whole length of the at least one cavity wall, or only a portion of it. In some embodiments, the first wall portion being stirred have a length of 0.05 meters-2.0 meters, or 0.10 meters-1.0 meters. The second opposing wall portion, which is opposed through the cavity width to the first opposing wall portion, has a substantially equal length or dimension to the first opposing cavity width.

The second thickness $h_2$ might be similar to the first thickness $h_1$, or it might be different, such as in cases wherein for instance, the second mixture is deposited in excess into the at least on cavity, or it is deposited onto parts of the first mixture.

The present disclosure provides a first tool actuated to stir one of the two opposing wall portions, in particular the area of the second layer, where the first opposing wall portion is located so that the first mixture of the first layer and the second mixture of the second layer are intermingled in this portion or area of the second layer.

The first tool is inserted at least partially into the second thickness $h_2$ of the second layer. The first tool is, for example, inserted in areas of the second layer where it contacts simultaneously the first mixture and the second mixture deposited into the at least one cavity of the first layer, or, in areas of the second layer where the first tool contacts the first opposing cavity wall portion, but not the second opposing wall portion.

According to embodiments in this disclosure, in between step c) and d), the stirring of the first opposing wall is produced while leaving the second wall portion unaffected resulting in a desired intermingling of one mixture by the other in order to incorporate some degree of controlled randomness and intentional visual asymmetry.

The first tool might be in the form of a blade, rake, fork, trident, stirrer, impeller, paddle, whisk, or beater.

The second layer is then compacted and hardened. For this, in illustrative embodiments, the second layer comprising the first and second mixtures, that include the areas where the first and second mixtures have been stirred, is, for example, covered with a protective sheet on its top surface and subjected to vacuum vibrocompaction.

In some embodiments, the second layer, once compacted, goes to a hardening or curing stage. In this stage, depending on the type of binder, as well as the use or not of any optional catalysts or accelerants, the compacted second layer may be subjected to the effect of temperature in a curing oven, or it might be left to cure at room temperature.

In some embodiments, the obtained agglomerated stone is allowed to cool down after step d) of compacting and hardening.

After hardening and, given the case, cooling, the artificial agglomerated stone obtained, which can be shaped as blocks, slabs, boards, plates, tiles or sheets, can be cut and/or calibrated to the desired final dimensions. Further, or in addition to the hardening and cooling, the artificial agglomerated stone obtained may be finished (polished, honed, etc.) on one or both of its larger surfaces, depending on the intended application.

In some embodiments, the first mixture and/or the second mixture comprises between 80 weight percent to 95 weight percent of inorganic filler and 5 weight percent to 20 weight percent of hardenable binder.

This high filler content contributes to make the first mixture and/or second mixture of a self-supporting consistence, so that the at least one cavity created does not close or change its shape during the time need to deposit the second mixture in them. Also, the high content of filler in relation to the binder results, among other characteristics, in an elevated superficial hardness and resistance to abrasion and scratching, as well as in a close appearance to natural stone.

In some embodiments, for both the first mixture and the second mixture, the inorganic filler comprises 70 weight percent to 95 weight percent of grain particles of a size ranging from 0.1 mm to 2.0 mm and 5 weight percent to 25 weight percent of micronized powders with particle sizes smaller than 100 micrometers.

Also, the inorganic filler, grain particles and/or micronized powders, may be selected from stone, stone-like and ceramic materials, such as quartz, silicate glass (virgin, frit or recycled), silica sand, feldspar, feldspathic sand, mirror, granite, basalt, (synthetic) cristobalite, dolomite, clay or porcelain ceramic, and mixtures thereof; or quartz, silicate glass (virgin, frit or recycled), silica sand, feldspar, feldspathic sand, (synthetic) cristobalite, clay or porcelain ceramic and mixtures thereof.

In some embodiments, the inorganic fillers might also comprise synthetic silicate granulates according to those described in WO 2021019020 A1 or WO 2021018996 A1.

In some embodiments, the first mixture of the disclosure, for example, comprises 5 weight percent to 20 weight percent of a hardenable binder, or a hardenable organic resin, based on the total weight of the mixture.

In some embodiments, the amount of hardenable binder or organic resin is 5 weight percent to 15 weight percent, or 5 weight percent to 12 weight percent, based on the weight of the agglomerated stone slab.

The hardenable binder of the first mixture and/or the second mixture is/are, for example, liquid or at least shall have some capacity to flow during the mixing with inorganic filler, during deposition of the mixtures, and/or during the compaction steps. The binder, after hardening, functions holding the inorganic filler particles together in the form of a slab.

The hardening of the binder, and thus, of the first and second mixtures after compaction, can ultimately be accelerated by raising the temperature, depending on the binder used, and/or by using suitable catalysts and accelerators as known in the art.

Additionally, additives, such as colorants or pigments, curing catalysts, curing accelerators, adhesion promoters (e.g., silanes), antimicrobial agents, ultraviolet stabilizers, rheology modifiers, or mixtures thereof, can be included in the first mixture. These types of additives and the proportion used thereof, are known in the state of the art. In some embodiments, these additives may be present in the first mixture in an amount of 0.01 weight percent-5.0 weight percent, based on the weight of the composition.

In another embodiment, the first and/or second mixture/s can be achieved, for example, by adding the different components to conventional industrial planetary mixers, followed by the step of stirring, or while stirring, in a manner known in the art.

In some embodiments, the inorganic filler of the first mixture and/or the second mixture comprises 5 weight percent to 50 weight percent of silicate glass, translucent synthetic silicate, or mixtures thereof.

In an embodiment, the silicate glass, the translucent synthetic silicate, or both, are white highly translucent silicates.

Thanks to their translucency, the silicate glass, the translucent synthetic silicate, or the mixture of both provides to the manufactured slab of the disclosure a chromatic effect which is more attractive and a higher color depth while opaquer particles only rely on the appreciation of effects present on the surface of the slab.

For example, the translucent or highly translucent silicate content allow that the chromatic effects generated by the disclosure are visible not only on the surface of the slabs, but they can be appreciated from the surface also into some depth of the slab material, advantageously enhancing the optical appeal of the material.

Additionally, the sum of the added amounts of crystalline silicate (quartz, cristobalite, tridymite) comprised in the first mixture, for example, ranges from 0 weight percent to 50 weight percent, or 0 weight percent to 40 weight percent, or 0 weight percent to 30 weight percent, or 0 weight percent to 15 weight percent, of the total weight of the first mixture, as measured e.g., by X-Ray Diffraction techniques disclosed below.

In addition to this embodiment, or in an alternative embodiment, the sum of the added amounts of crystalline silicate (quartz, cristobalite, tridymite) in the second mixture, for example, ranges from 0 weight percent-50 weight percent, or 0 weight percent-40 weight percent, or 0 weight percent-30 weight percent, or 0 weight percent-15 weight percent, of the total weight of the second mixture.

In an embodiment, the hardenable binder is an organic resin, hydraulic cement based or a geopolymer based material.

For example, the hardenable binder is an organic resin. Further for example, the binder is a translucent organic resin.

The term hardened organic resin and hardenable organic resin are understood as a material of predominantly organic nature formed by a compound or a mixture of compounds, optionally including a diluent.

The compound or the compounds in the mixture of compounds in the resin might be monomeric, oligomeric or polymeric, optionally with variable molecular weights and crosslinking degrees.

At least some of the compounds in the hardenable organic resin, and optionally also the diluent, have functional reactive groups capable of undergoing curing by a crosslinking or curing reaction which hardens the organic resin, resulting in a hardened organic resin (or hardened binder) when the curing is concluded.

Also for example, the hardened (reacted or polymerized) organic resin is a hardened organic thermosetting resin, suitably liquid when not hardened, and may be selected from unsaturated polyester resins, acrylate and methacrylate-based resins, vinyl resins and epoxy resins.

The hardenable organic resins are, for example, reactive and can be hardened in a curing (or cross-linking) reaction, for instance, when energy, such as heat or radiation, is applied to them. The hardened organic resin is, for example, translucent and or transparent, to favor the visual appreciation of the chromatic effects sought by the disclosure.

In an embodiment, the organic resin is a translucent organic resin, such as a translucent unsaturated polyester resin.

In an embodiment, the unsaturated polyester resin comprises a prepolymer obtained by polymerization of unsaturated dicarboxylic acids (or anhydrides) with diols. For example, by the condensation of an acid or anhydride such as maleic acid or anhydride, fumaric acid, (ortho)phthalic acid, isophthalic acid, terephthalic acid, adipic acid, succinic acid, sebacic acid, or mixtures thereof, with a diol such as ethylene glycol, diethylene glycol, propylene glycol, butylene glycol, neopentyl glycol, hydrogenated bisphenol A, or mixtures thereof.

Additionally, the unsaturated polyester resin also comprises an ethylenically unsaturated monomer as a diluent, such as styrene, for example, in an amount of 25 weight percent to 45 weight percent based on the weight of the prepolymer.

The first and the second mixture might have the same composition and/or the same inorganic filler particle size distribution. In an embodiment, the first mixture and the second mixture have different composition or different inorganic filler particle size distribution or both.

In embodiments herein, the first mixture and the second mixture have different colors, e.g., by comprising different types and/or concentrations of pigmenting compounds or dyes, or by having differently colored inorganic fillers, or both.

In an embodiment, in between steps b) and c), a first pigment composition is applied to the at least one cavity wall of the at least one cavity.

The first pigment composition is, for example, applied to the two opposed wall portions comprised in the at least one cavity wall. Also, the first pigment composition is, for example, colored with a tone or hue that creates a strong contrast with the color of the first and/or second mixtures.

Additionally, the first pigment composition is, for example, sprayed or projected into the at least one cavity wall and/or opposed cavity wall portions. The first pigment composition might be solid or liquid.

In some embodiments, the first pigment composition comprises a dye or pigment dispersed, dissolved or diluted in a liquid solvent compatible with the dye or pigment, and with the binder. Moreover, the liquid solvent is, for example, reactive with the binder of the first and/or second mixtures.

Also, the application of the pigment composition to the opposed cavity wall portions, such as when the pigment composition is selected to provide some visual contrast, reinforces the visual appreciation of the intermingling between the first and second mixtures caused in steps performed between steps c) and d) of the method of the disclosure.

In an embodiment, during step a), the first mixture is deposited onto the surface by means of a first distributing means and/or, during step c), the second mixture is deposited into the at least one cavity by means of a second distributing means.

In some embodiments, the first mixture is deposited onto the surface by using a first distributing means and the second mixture is deposited onto the cavities of the first mixture and optionally partially also onto the surface of the first layer by using a second distributing means.

For example, distributing means known for being suitable for depositing these mixtures are, for instance, those distributor devices used for the distribution of the (unhardened) agglomerated mixtures in the manufacture of quartz agglomerated surfaces. The distributor devices suitably consist of a feeding hopper that receives the first mixture from the mixers in the top opening thereof and a conveyor belt positioned below the bottom outlet opening of the hopper, which collects and/or extracts the first mixture from the hopper and deposits it to the surface. However, other distributor devices are possible within the general concept of the disclosure.

In some embodiments, the first distributing means are movable along the length (this is, the longest dimension) of the surface, which suitably corresponds to the length (or longest dimension) of the slab being manufactured. Also for example, the first distributor deposits the first mixture covering the full width of the slab being manufactured, as it moves along the length of the surface.

The method of the present disclosure envisages the deposition of a second mixture into the at least one cavity created in the first layer. This deposition can be done by different means without departing from the scope of the general concept of the disclosure.

In some embodiments, the second distributing means are moved over the first layer to the locations where the at least one cavity is present. This can be achieved, for instance, if the second distributing means are mounted on a robotic device, such as an anthropomorphic robotic arm or a cartesian robot. Additionally, the movement of the second distributing means and the amount of second mixture discharged in any location over the first layer are synchronized so that the second mixture is predominantly deposited into the at least one cavity.

The second distributing means for filling the cavities with second mixture can be, for example, any of the distributors mounted on a robotic device disclosed in the document EP3713729A1.

In some embodiments, the second distributing means are a hose moved by a robotic device, and with a pneumatic second mixture discharging system, optionally provided with one or several shutters, endless screws, valves, and the like, to regulate the amount of mixture being discharged.

Other methods for depositing the second mixture into the at least one cavity formed in the first layer are possible, and inside the scope of the disclosure.

Alternatively, and although not practical in an industrial setting, the second mixture could be deposited manually into the at least one cavity.

In an embodiment, the surface is a sheet of Kraft paper, a sheet or film of a polymeric material, a flat sheet of film or a temporary mold.

In some embodiments, the first mixture is deposited onto a surface to form a first layer having the first thickness $h_1$. The surface can be a sheet of a material compatible with the first mixture, such as a sheet of Kraft paper or a sheet or film of a polymeric material—e.g., a rubber sheet.

In non-limiting embodiments, the surface is part of a temporary mold, for instance, the bottom of a tray-shaped mold, which is used to retain the first mixture during the manufacturing of the slab.

In additional embodiments, the surface is a flat sheet or film which supports and carries the self-supporting first mixture with the shape of a slab on top of it through the different slab manufacturing steps.

As previously mentioned, in the step b) of the method of the disclosure, at least one cavity having a width $w_i$ and a length $L_i$ is created in the first layer.

In an embodiment, the at least one cavity is defined by a width $w_i$ varying along the length $L_i$ of the at least one cavity or a width $w_i$ varying along the first thickness $h_1$ of the first layer or varying along both the length $L_i$ and the first thickness $h_1$ of the first layer.

The at least one cavity width $w_i$ might vary along the extension of the at least one cavity, or along the first thickness, or it might be constant.

In some embodiments, the at least one cavity define a path with a length, the longest dimension of the path, and a width, the shortest dimension of the path.

In another embodiment, the at least one cavity comprises two or more intersecting or overlapping cavities.

In an embodiment, the at least one cavity width $w_i$ ranges from 0.03 m-1.00 m, further for example, ranges from 0.05 m-0.50 m.

The at least one cavity may extend longitudinally, either lengthwise, diagonally or widthwise, across the length and width of the slab shaped first layer.

The method for manufacturing a slab of the present disclosure is not limited by the width of the created cavities in order to enhance the possibilities of simulating different types of natural stones.

In some embodiments, the at least one cavity length $L_i$ ranges from 0.01 m-3.5 m, such as from 0.1 m-3.3 m.

The method for manufacturing a slab of the present disclosure is not limited by the length of the created cavities in order to enhance the possibilities of simulating different types of natural stones.

In an embodiment, during step b), the at least one cavity in the first layer is created by means of a template.

In an embodiment, a first template is used for creating the at least one cavity in the first layer. However, the general concept of the present disclosure is not limited to this particular embodiment.

In some embodiments, the first template comprises one or a several forms—or shapes—defining a pattern corresponding to the at least one cavity to be obtained in the first layer. The form or forms are, for example, mounted in a framed structure comprised in the first template. The form or forms might define a contour, and might be solid or hollow bodies. Then, the first template is positioned over the surface before the first mixture is deposited onto it.

In some embodiments, by removing the first template after the first mixture has been deposited, and before the second mixture is deposited in step c), at least one cavity is created in the first layer where the form or forms were located.

The template, and the form/forms it might comprise, can have any desired shape or combination of shapes, and may define any desired pattern. In some embodiments, the form or forms are shaped following longitudinal paths, following regular or irregular general directions, and extending partially or fully through the whole length and/or width of the slab being manufactured.

The form or forms might have a length ranging from 1 cm to 3.5 m, or 10 cm to 3.3 m, and a width ranging from 1 cm to 100 cm, or from 3 cm to 50 cm, and a height ranging from 15.0 cm to 0.5 cm, or 10.0 cm to 1.0 cm. Additionally, the forms can be designed to partially or fully block the deposition of the first mixture onto the parts of the surface they cover, or alternatively, instead of blocking, they can divert the first mixture being discharged by the distributor away from the areas covered by the forms, and into the areas not covered by the forms, for instance, by having a crest-shaped upper part.

The at least one cavity wall defining the at least one cavity created by the first template, can be made having a parallel or inclined general planar direction in relation to the direction of the first thickness, by a corresponding design of the forms in the first template.

Different templates for creating cavities in the first layer are possible and inside the broadest scope of the disclosure. Also, more than one template can be used. Non-limiting examples of templates useful for the method of the disclosure are described in document EP3713729A1.

In an embodiment, during step b), the at least one cavity in the first layer is created by means of a wheel-shaped indenter.

In an embodiment, the at least one cavity is, for example, created after the first mixture has been deposited onto the surface. Then, the wheel-shaped indenter is inserted from the upper side at least partially into the first thickness $h_1$ of the deposited first layer, and moved (e.g. by being coupled to the end of an automatic robotic arm), while being inserted, through the first layer.

In some embodiments, the wheel-shaped indenter might be shaped as two frustums of right cones joined by their bases, having a rotation axis coinciding with their frustum axes, with a maximal wheel width at the location of the rotation axis.

The maximal width size of the wheel-shaped blade can be suitably selected corresponding to the maximal width of the at least one cavity to be achieved in the first layer, and may range from 20 mm to 120 mm, or 30 mm to 110 mm. The maximal outer diameter of the wheel-shaped indenter may range from 100 mm to 300 mm, or 150 mm to 250 mm.

By moving the wheel-shaped indenter inserted and through the first layer, following certain trajectories, cavities defining at least one cavity wall are created as result of the indenter pressing the first mixture with its slanting laterals. The depth and width of the cavities can be controlled by controlling the depth to which the wheel-shaped indenter is inserted into the first layer, the width of the wheel-shaped indenter and/or the slope of the wheel slanting laterals. Other shapes and designs of the indenter are possible and well inside the general scope of the disclosure.

Other methods of the present disclosure for creating at least one cavity in the first layer are possible and well inside the general concept of the disclosure. Thus, the at least one cavity might be created by at least one (non-rotating) insert, or a combination of inserts, which is introduced from the upper side into the deposited first layer of first mixture. This can be achieved by arranging the at least one insert or combination of inserts over the first layer, as it rests onto the surface, and then moving it down until the insert or combination of inserts penetrated the desired depth into the first layer.

By raising the at least one insert or combination of inserts to its original position (or by lowering the position of the first layer), at least one cavity defined by at least one cavity wall is created into the first layer, with shapes and paths corresponding to the shapes and paths of the at least one insert or combination of inserts. As with the form or forms in the embodiment using a first template, the insert or combination of inserts may have any desired shape, and they can define any desired pattern.

The insert or inserts may follow regular or irregular general directions, and they might extend partially or fully through the whole length and/or width of the slab being manufactured. As well, the insert or inserts might be inserted partially or fully through the first thickness of the first layer.

In other embodiments, the at least one cavity might be created removing the first mixture from specific locations in the first layer, for instance, as a suctioning or aspirating device is moved (e.g., by a robotic device) over the first layer and the first mixture under the device gets suctioned or aspirated.

The at least one cavity, in any of the embodiments herein, is defined by at least one cavity wall. As mentioned above, the at least one cavity wall may extend partially or fully through the first thickness of the first layer. In other words, the at least one cavity created by any of the methods covered by the disclosure does not need to be completely free of first mixture.

In some embodiments, it is that the first mixture is partially allocated in the areas over the surface where the at least one cavity is created. For example, the first mixture fills less than 75% and more than 5% of the cavity volume, or less than 50% of the cavity volume and more than 10% of the cavity volume, wherein the cavity volume is understood as the volume defined by the projection in the direction of the first thickness of the upper cavity walls edges.

In an embodiment, during step c), a portion of the second mixture is deposited also outside of the at least one cavity, preferably proximal to the at least one cavity.

For example, the second mixture shall at least partially fill the at least one cavity, such as at least 75% or 80% of the volume of the at least one cavity, and it is possible that it is deposed in excess and some of the second mixture overflows or forms a bulge reaching out of the cavity. Alternatively, the second distributing means can be made to deposit the second mixture in the at least one cavity, but also a part outside the at last one cavity.

In some embodiments, it is, for example, that from 3%—20% of the second mixture is deposited outside the at least one cavity. In some embodiments, this enhances the intermingling effect sought by the method of the disclosure.

Also for example, the second mixture is deposited at most at 10 cm from the first wall portion of the at least one cavity.

After the deposition of the second mixture, a second layer is formed comprising the combination of the first mixture and the second mixture deposited into the at least one cavity of the first layer. The second layer has a second thickness $h_2$, understood as the maximal thickness of the second layer, following the same definition as the first thickness $h_1$ in relation to the first layer. This second thickness $h_2$ might be equal or different to the first thickness $h_1$.

As above mentioned, after the second mixture is deposited and the second layer is formed, the method of the disclosure comprises inserting a first tool at least partially into the second thickness $h_2$ of the second layer.

In an embodiment, the first tool is rotatable around an axis X-X' essentially parallel to the second thickness $h_2$ of the second layer.

The first tool might be in the form of a blade, rake, fork, trident, stirrer, impeller, paddle, whisk, or beater. The first tool is, for example, mounted on a robotic anthropomorphic arm or a XYZ Cartesian robot, so that it can be programmed to automatically move through the second layer following trajectories, stirring it, as well as close and away from the surface holding the second layer.

Also, the rotational movement suitably is produced around an axis X-X' which is substantially parallel to the direction of the second thickness $h_2$ of the second layer. In some embodiments, when the first tool is configured to comprise a number of separated prongs, such as 2 to 8 prongs, distributed, homogeneously or not, around the rotation axis. The speed of rotation might range from 1 rpm-30 rpm, or 5 rpm-25 rpm. The rotation might be done in any clockwise or anticlockwise direction, or the rotation might be alternated between periods of clockwise rotation and periods of anticlockwise rotation.

Further for example, the rotation of the first tool while inserted in the second layer, stirs (or breaks) the first opposing wall portion.

In some embodiments, the first tool comprises a number of separated prongs, such as 2 prongs to 8 prongs, distributed, homogeneously or not, around the rotation axis X-X'.

The first tool might have a length and/or a width ranging from 1 cm to 30 cm, or such as from 2 cm to 20 cm. The first tool may also have a larger outer diameter, for example, when the first tool is shaped as a closed curve, such as a circle, an ellipse, an oval or an ovoid, in the range from 1 cm to 30 cm, or such as from 2 cm to 20 cm.

In some embodiments, the first tool is provided with a projecting head for a second pigment composition. The projecting head, when in use, projects or sprays the second pigment composition to the areas of the second layer being stirred by the first tool.

In an embodiment, the first tool is moved following at least partially the path of the first wall portion being stirred.

This can be achieved by the first tool being mounted in a programmable automatic robotic device that moves the first tool and being inserted through the second layer. The first tool might also be moved in programmed trajectories approaching or departing from the surface where the second layer rests, in the direction of the second thickness $h_2$, producing, advantageously, additional intermingling and randomness effects.

In an embodiment, the stirring of the first opposing wall portion, suitably by the rotational movement of the first tool, is done such as to produce a visually noticeable intermingling of the first and second mixtures. The stirring, for example, produces the transferring respectively of the first mixture outside, and of the second mixture inside, the areas where the cavities were created The present disclosure also provides an artificial agglomerated stone slab comprising at least a first and a second mixtures defining chromatic effects, being manufactured according to the method of any of the embodiments of the inventive aspect of the disclosure.

The artificial agglomerated stone slab dimensions are at least 1500 mm in length, at least 1000 mm in width and 4 mm-40 mm in thickness; such as 2000 mm-3500 mm in length, 1000 mm-1800 mm in width and 4 mm-40 mm in thickness.

The artificial agglomerated stone slab has, for example an apparent density in the range from 2000 kg/m$^3$-2600 kg/m$^3$, or from 2100 kg/m$^3$-2500 kg/m$^3$. Apparent density can be measured according to EN 14617-1:2013-08.

The water absorption of the artificial agglomerated stone slab, for example, does not exceed 0.10%, or 0.07%, or 0.05%, according to EN-14617-1:2013.

The artificial agglomerated stone material might be used for construction or decoration, for manufacturing counters, kitchen countertops, sinks, shower trays, wall or floor coverings, stairs or similar.

Artificial agglomerate stone slabs having an essentially reproducible appearance are manufactured in an industrial setting according to the method of the first aspect of the disclosure.

The inventive concept also covers a plant for the manufacture of the mentioned artificial agglomerated slabs, where the plant is configured for applying the method of any of the embodiments described herein. Such plant might be designed comprising any of the embodiments of the means and devices disclosed herein for the different embodiments of the method of the disclosure.

DESCRIPTION OF THE DRAWINGS

These and other features and advantages of the disclosure will be seen more clearly from the following detailed description of embodiments provided only by way of illustrative and non-limiting example in reference to the attached drawings.

DESCRIPTION

As will be appreciated by one skilled in the art, aspects of the present disclosure may be embodied as method or product directly obtained from the method for manufacturing the product.

FIG. 1a and FIG. 1b depict two embodiments of cavity shapes that can be created. For example, FIG. 1a shows a specific embodiment of a cavity being shaped as an ellipse and FIG. 1b shows a specific embodiment of a cavity being circular. In both cases, these figures define the dimensions, length $L_i$ and width $w_i$, and their positions in order to characterize each one of the cavities. In an elliptical shaped cavity, for example, the length $L_i$ is equal to the major axis of the cavity. In a circular shaped cavity, for example, the length $L_i$ is equal to one diameter of the cavity. Additionally, and also in both cases, the width $w_i$ is perpendicular to the length $L_i$ and the cavity width $w_i$ is variable up to a maximum $w_{imax}$.

Figure 2:
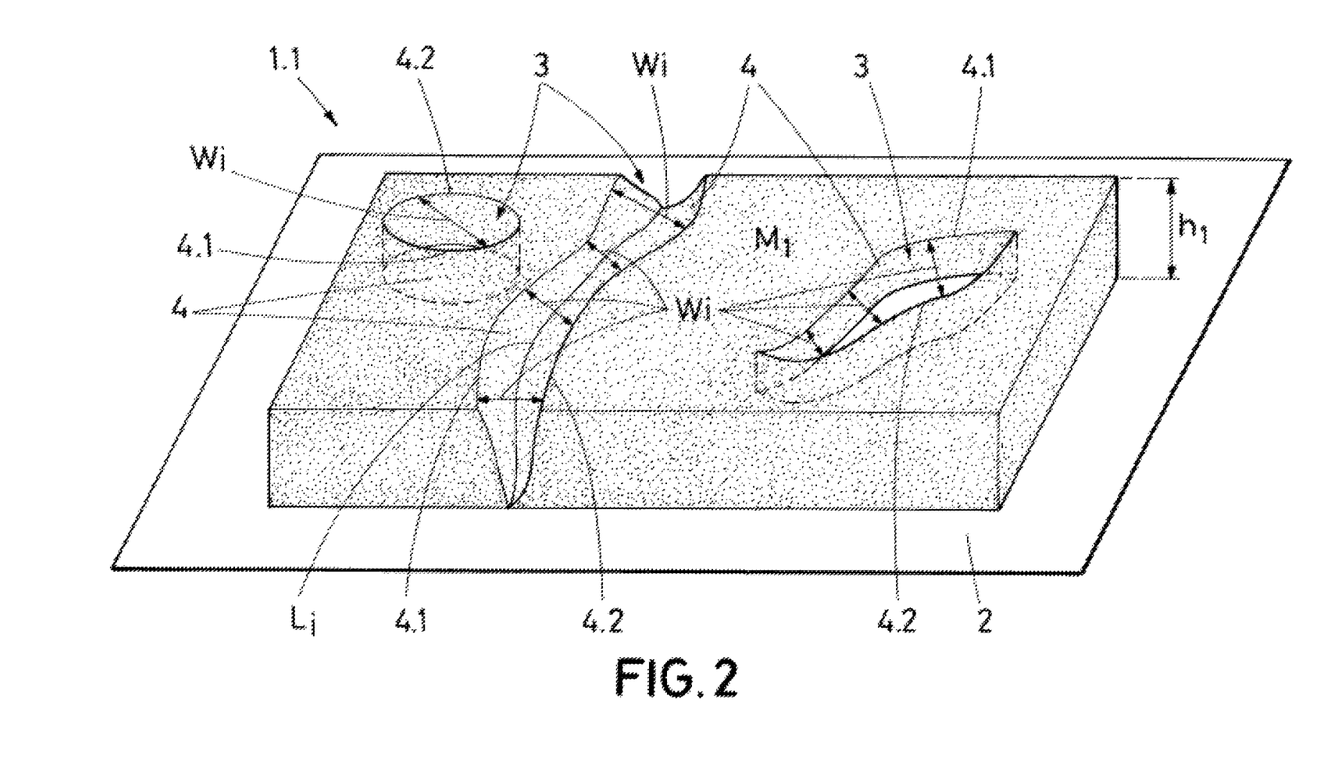
FIG. 2 This figure shows a perspective view of a first layer of a first mixture comprising 3 cavities according to an embodiment of the disclosure.

FIG. 2 shows an exemplary embodiment of a first layer (1.1) of a first mixture ($M_1$) after performing a first a) and second b) step of the method for the manufacture of slabs of artificial agglomerated stone. Previously to the creation of the cavities 3 in the embodiment shown in FIG. 2, a first layer (1.1) of first mixture ($M_1$) is deposited onto a surface (2), wherein the first layer (1.1) has a shape corresponding to the shape of the slab to be manufactured, and presents a first thickness $h_1$. In embodiments, the first layer (1.1) has a first thickness $h_1$ of 4.5 cm.

In some embodiments, the surface (2) is a sheet of Kraft paper, a sheet or film of a polymeric material, or a temporary mold.

As shown in FIG. 2, at least one cavity (3) is comprised in the first layer (1.1) of first mixture ($M_1$). In some embodiments depicted in FIG. 2, the slab-shaped first layer (1.1) presents 3 different cavities (3) of different shapes.

The two cavities respectively on the left and right side of the first layer (1.1) shown in FIG. 2 might have a cavity width at its widest part of 15-30 cm, and might be created with a template (not shown) as disclosed in embodiments herein. In this embodiment of the disclosure, the template (not shown) is designed having two different solid forms mounted in a framed structure of 3.4 m length and 1.7 m width. The template is positioned over and in contact with a surface (2). In this non-limiting example, the forms had an oval and a wavy shape, respectively, corresponding to the shapes of the cavities on the left and right side of the first layer (1.1) shown in FIG. 2.

In the same embodiment, the first mixture ($M_1$) is deposited from a first distributor onto the surface, and over the template. The deposition of the first mixture ($M_1$) is performed by moving the distributor over and along the length of the template, while discharging the first mixture ($M_1$) all through the template width. Once the discharging of the first mixture is concluded, the template is removed leaving a first layer (1.1) of the first mixture ($M_1$) on top of the surface, having the two cavities (3) with shapes corresponding to the forms in the template. Although the first mixture is self-supporting, and the cavities (3) are retained without fully collapsing, about 10% of the volume of the cavity might be filled with the first mixture (not shown in FIG. 2) upon removal of the template.

The central cavity crossing the first layer (1.1) from lateral edge to lateral edge might be created using a wheel-shaped indenter, as disclosed in embodiments above. At the top left of FIG. 2, the cavity (3) is essentially elliptical. Then, at the right side of the slab-shaped first layer (1.1), it is shown a cavity (3) having a vein shape extending over the whole thickness $h_1$ of the first layer (1.1) and showing substantially vertical walls (4). Finally, the central cavity is shown having a vein shape extending over the whole width of the slab-shaped first layer (1.1), crossing it laterally, and presenting inclined walls (4).

In an embodiment, each cavity (3) is defined by a width $w_i$ varying along the length $L_i$ of the cavity (3) or a width $w_i$ varying along the first thickness $h_1$ of the first layer (1.1) or varying along both the length $L_i$ and the first thickness $h_1$ of the first layer (1.1).

In the same embodiment, each cavity (3) presents a first wall portion (4.1) and a second wall portion (4.2) in opposition through the at least one cavity width $w_i$ and extending at least partially along the cavity length $L_i$, and throughout the first thickness $h_1$ of the first layer (1.1) of first mixture ($M_1$).

Figure 7:
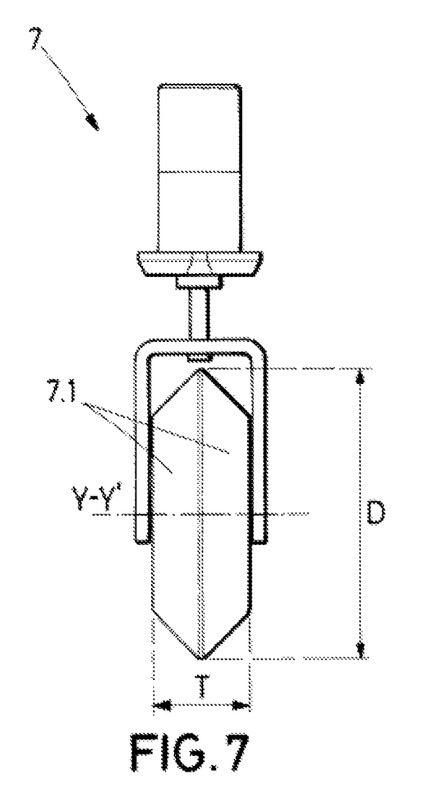
FIG. 7 This figure shows a schematic front view of an embodiment of a wheel-shaped indenter for creating a cavity in the first layer of first mixture according to certain embodiments.

In some embodiments, at least one cavity (3) in the first layer (1.1) is created by means of a wheel-shaped indenter, for example, the wheel-shaped indenter (7) further shown in FIG. 7. The at least one cavity (3) might be created by moving the wheel-shaped indenter (7) through the first layer (1.1) when inserted in the first layer (1.1). Thus, in the embodiment of FIG. 2, by following certain trajectories with the indenter (not shown), the central cavity (3) defining at least one cavity wall (4.1, 4.2) is created as a result of the indenter pressing and/or displacing the first mixture ($M_1$). The depth and width of each cavity can be controlled by controlling the depth to which the wheel-shaped indenter (not shown in FIG. 2) is inserted into the first layer (1.1). Other shapes and designs of the indenter and of the cavity created are contemplated in other embodiments of the disclosure.

Also in an embodiment, the first layer (1.1) of first mixture ($M_1$) is deposited onto the surface (2) by means of a first distributing means (not shown).

Figure 3:
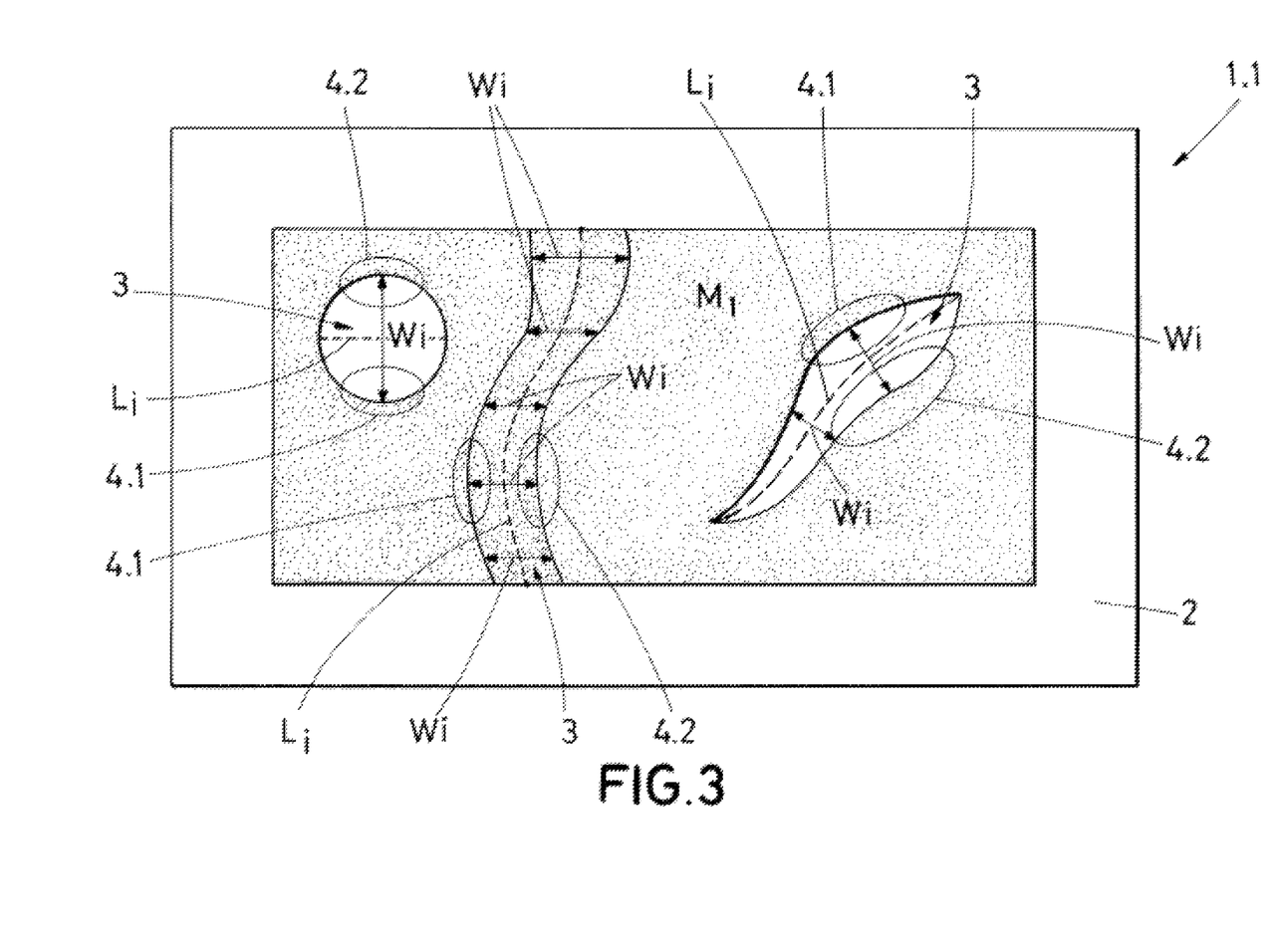
FIG. 3 This figure shows a view from above according to the same embodiment shown in FIG. 2

FIG. 3 is a view from above of the embodiment also shown in FIG. 2. This embodiment depicts a first layer (1.1) of a first mixture ($M_1$) after performing a first a) and second b) step of the method for the manufacture of slabs of artificial agglomerated stone. As also shown in FIG. 2, the first layer (1.1) of first mixture ($M_1$) is deposited onto a surface (2), wherein the first layer (1.1) has a shape corresponding to the shape of the slab to be manufactured.

In FIG. 3, the 3 cavities (3) show a first wall portion (4.1) and a second wall portion (4.2) which are 2 portions (4.1, 4.2) of the perimeter of each cavity (3) and where the portions (4.1, 4.2) are wall portions opposed through the width of each cavity (3). Also in FIG. 3, the wall portions (4.1, 4.2) are represented as circled and are small segments or sections of the perimeter of each cavity (3). That is, the cavity walls (partially shown in this Figure) can be divided in a multitude of small segments where one of the multitude of small segments can be selected as a first wall portion (4.1). The second wall portion (4.2) is always defined as the wall portion in opposition to the first wall portion (4.1) through the at least one cavity width $w_i$.

Furthermore, each wall portions (4.1, 4.2) defines a segment of the upper surface of the cavity walls (partially shown in this Figure) of each cavity (3), the upper surface being the top of the first layer (1.1) of first mixture ($M_1$). Both of these wall portions, the first wall portion (4.1) and the second wall portion (4.2), are separated by a distance equal to the width $w_i$ crossing one unique point of the cavity length $L_i$. Each cavity width $w_i$, defined by two opposite wall portions (4.1, 4.2) is crossing one unique point of the length $L_i$ of each cavity (3) following the shape of the cavity (3). Also, the first wall portion (4.1) always defines the side of the cavity wall or wall portion to be stirred.

Figure 4:
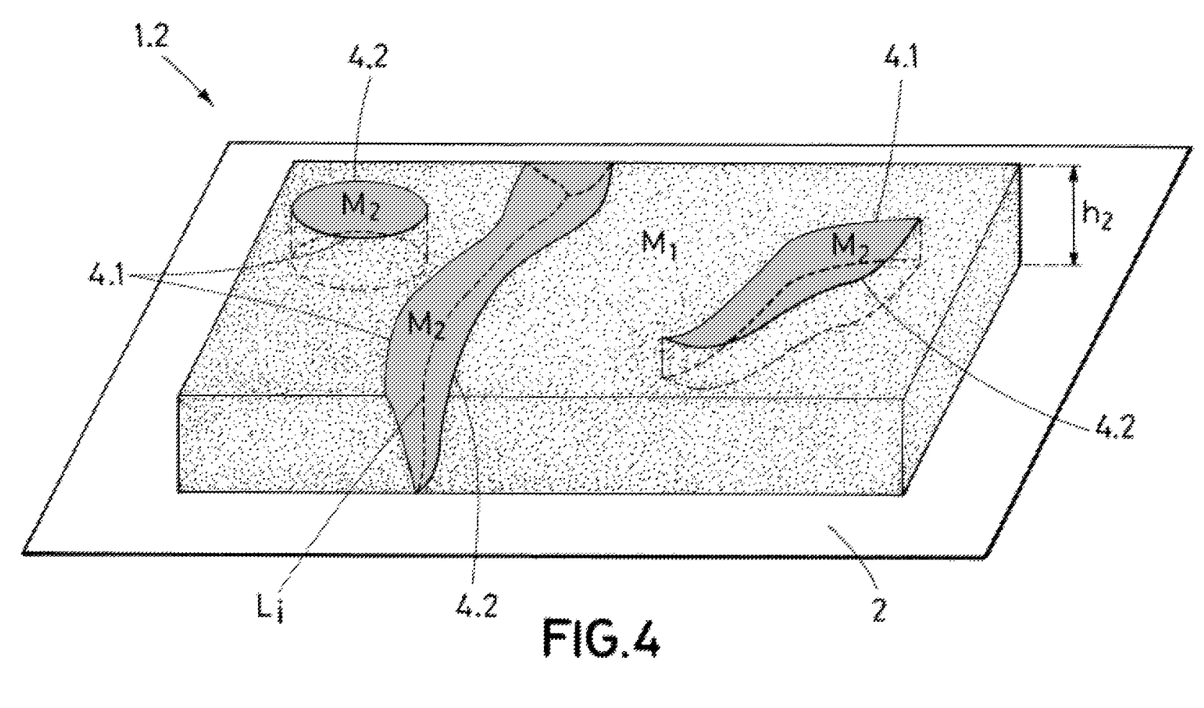
FIG. 4 This figure shows a perspective view of a second layer according to an embodiment of the disclosure, comprising a combination of a first mixture and a second mixture deposited filling the 3 cavities of the first layer of FIG. 1.

FIG. 4 shows the following step of the manufacture of a slab of artificial agglomerated stone where a second mixture ($M_2$) has been deposited into each previously created cavity (3) of the first layer (1), to form jointly with the first mixture ($M_1$) a second layer (1.2). The second layer (1.2) presents a second thickness $h_2$.

In some embodiments, the first and/or second walls (4), or first and/or second wall portions (4.1, 4.2) of the cavities (3) created in the first layer (1.1), before the second mixture ($M_2$) is deposited into them, are sprayed using a nozzle mounted on a robotic device (not shown in the Figures) with a dark black pigment composition comprising styrene and a dye.

Subsequently, a second distributor (not shown) mounted on a robotic device deposits the second mixture ($M_2$) into the cavities (3), creating a second layer (1.2) on top of the surface by the combination of the first and second mixtures ($M_1$ and $M_2$). The second mixture ($M_2$) is discharged in controlled amounts as the robotic device is moved over the first layer (1.1). The depositing of the second mixture ($M_2$) is predominantly made into the cavities (3), filling them to more than 75 weight percent of their volume, and with 1 to 5 weight percent of the second mixture ($M_2$) being deposited outside the cavities (3) (not shown) in areas proximal to or not farther than 10 cm from the cavity walls (4). In the embodiment shown in FIG. 4, the second layer (1.2) has a thickness $h_2$ practically identical to the thickness $h_1$ of the first layer (1.1).

In some embodiments, the second mixture ($M_2$) at least partially fills each of the cavities (3), for example, it fills 75% to 100% of the volume of each of the cavities (3).

In another embodiment, the second mixture ($M_2$) is deposited in excess and some of the second mixture ($M_2$) overflows or forms a bulge reaching out of each cavity (3).

In some embodiments of the disclosure, the first mixture ($M_1$) and/or the second mixture ($M_2$) comprises between 80 weight percent to 95 weight percent of inorganic filler and 5 weight percent to 20 weight percent of hardenable binder. Additionally, the inorganic filler of the first mixture ($M_1$) and/or the second mixture ($M_2$) comprises 5 weight percent to 50 weight percent of silicate glass, translucent synthetic silicate, or mixtures thereof. Finally, the hardenable binder is an organic resin, hydraulic cement based or a geopolymer based material. Further for example, the organic resin is a translucent organic resin and/or an unsaturated polyester resin.

In an embodiment, the first mixture ($M_1$) and the second mixture ($M_2$) have different composition or different inorganic filler particle size distribution or both.

In further embodiments of the disclosure, the two mixtures ($M_1$ and $M_2$) are previously prepared in separated planetary mixers comprising different amounts of granulates and powders, having different particle sizes, of quartz, synthetic cristobalite, feldspar and recycled silicate glass, and a liquid transparent unsaturated polyester resin. Two different pigment mixtures are added to each of the mixtures ($M_1$ and $M_2$) so that they have a different coloration. For example, the amount of granulates and powders make is 85 weight percent to 90 weight percent of the total weight of the mixtures ($M_1$ and $M_2$), while the remaining 12 weight percent to 7 weight percent is made up by the resin, with the remaining 0.5 weight percent to 3.0 weight percent being colorants, catalysts, accelerants and other additives. Both mixtures ($M_1$ and $M_2$) comprise 15 weight percent to 30 weight percent of silicate glass, in relation to the total weight of each mixture ($M_1$ and $M_2$).

Figure 5:
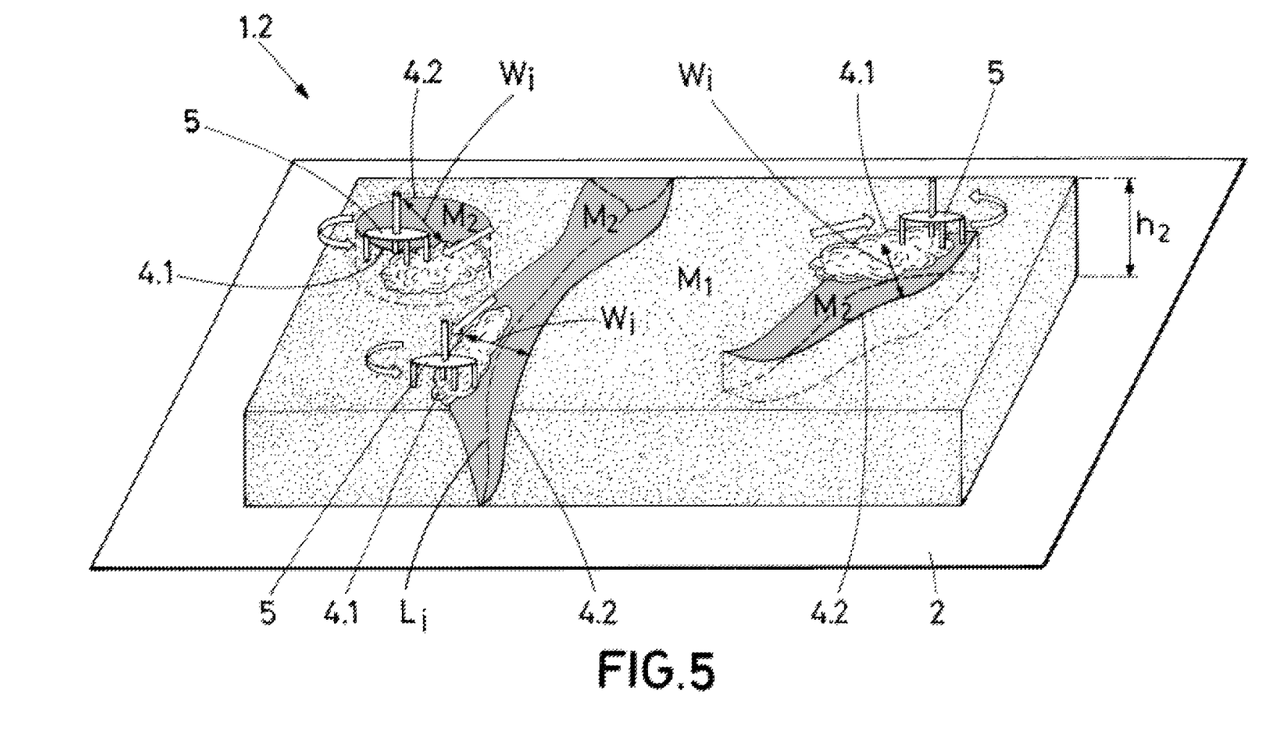
FIG. 5 This figure shows a perspective view of a second layer according to an embodiment of the disclosure, where three cavity wall portions of each cavity of FIG. 1, are stirred.

FIG. 5 shows the step after forming the second layer (1.2) by depositing the second mixture ($M_2$) into the cavities (3) of the first layer (not shown). In that particular step, a first tool (5) in inserted, at least partially, into the second thickness $h_2$ of the second layer (1.2) and then the first tool (5) is actuated wherein the first tool (5) is configured to stir a first wall portion (4.1) of each cavity (3) while not stirring a second wall portion (4.2) opposed to the first wall portion (4.1) along the cavity width $w_i$. The stirring of the first wall portion (4.1) of each cavity (3) is responsible for the asymmetrical intermingling effect sought by the method of the disclosure.

In an embodiment, the first tool (5) is in the form of a blade, rake, fork, trident, stirrer, impeller, paddle, whisk or beater.

Figure 6:
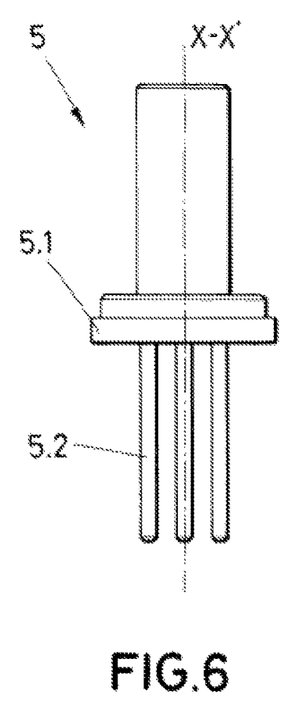
FIG. 6 This figure shows a schematic front view of an embodiment of the first tool according to certain embodiments, configured to stir the second layer.

FIG. 6 shows an embodiment of the first tool (5) responsible for stirring one of the two opposing wall portions, in particular the area of the second layer (1.2) where the first opposing wall portion (4.1.) is located (not shown in this FIG. 6, but in FIG. 5).

In some embodiments, the first tool (5) presents a plurality of separated prongs (5.2). In further embodiments, the first tool (5) presents from 2 to 8 separated prongs (5.2). In the embodiment shown in FIG. 4, the first tool (5) presents three separated prongs (5.2). The separated prongs (5.2) are distributed homogeneously, or not, around the rotation axis X-X'.

In an embodiment, the first tool (5) presents a plate (5.1), such as round, which is rotatable around the axis X-X', which might be essentially parallel to the second thickness $h_2$ of the slab-shaped second layer (1.2) as shown in FIG. 3. For example, the plate in the first tool (5) is shaped as a closed curve, such as a circle, an ellipse, an oval or an ovoid, ranging from 1 cm to 30 cm, or such as from 2 cm to 20 cm.

Also in an embodiment, the first tool (5) has a larger outer diameter and a length and/or a width of 1 cm to 30 cm, such as 2 cm to 20 cm.

In some embodiments, the first tool (5) is provided with a projecting head (not shown) for a second pigment composition. The projecting head, when in use, projects or sprays the second pigment composition to the areas of the second layer being stirred by the first tool (5).

In an embodiment shown in FIG. 6, the first tool (5) is configured comprising a round 'fork', formed by three-prongs (5.2) homogeneously distributed around a rotation axis X-X' and fixed to a round plate (5.1) with an outer diameter of e.g. 10 cm. This tool can be coupled to the end (or hand) of a robotic arm, to be inserted into the second layer (1.2), more preferably in an area of the second layer (1.2), where a first cavity wall portion (4.1) of the cavity (3) is present. When in use in embodiments of the method of the disclosure, the first tool (5) is inserted into the second layer (1.2) so that it contacts the first cavity wall portion (4.1), but it does not contact the opposed cavity wall portion, or second cavity wall portion (4.2), which is opposed to the first cavity wall portion (4.1) through the cavity width $w_i$.

When in use in embodiments of the inventive method, the first tool (5), for instance, the first tool (5) shown in FIG. 6, is firstly inserted into the second thickness $h_2$ of the second layer (1.2) until the separation of the end-parts of the prongs with the surface (2) is approximately 1 cm. Then, the first tool (5) is actuated (in this example, by a computer program) to produce the rotation of the three prongs (5.2) around the rotation axis X-X', and simultaneously moved following the longitudinal path along the second layer (1.2) of the first cavity wall portion (4.1), e.g. for 5 to 30 centimeters, while avoiding contacting the opposed second cavity wall portion (4.2) along the path. This is schematically shown in FIG. 5. The rotation of the three prongs (5.2) produces the intermingling of the first and second mixtures ($M_1$ and $M_2$) in the areas where the first wall portion (4.1) is present. The second opposed cavity wall portion (4.2) is not stirred by the round fork (5). The same process is repeated in the other two filled cavities (3) present in the second layer (1.2) of the present embodiment, along different portion lengths along the longitudinal paths of their respective cavity wall sections (4).

In an embodiment, the second opposing wall portion (4.2) is not stirred by the first tool (5), or by any other tool, during the manufacture of the slabs of artificial agglomerated stone.

Once the stirring with the first tool (5) is completed, in subsequent steps not shown in the Figures, the second layer (1.2) is covered on its exposed surface with a protective sheet, e.g., of Kraft paper, before it is transferred to a vacuum vibrocompaction press. For example, after compaction, the second layer (1.2) is hardened in a kiln for about 40-60 minutes at 70-110° C.

The compacted and hardened slab of artificial agglomerated stone obtained according to these embodiments, are trimmed and calibrated to the final dimensions, e.g., of 3.3×1.6 cm, and one of the two major surfaces is polished to enhance the appreciation of the chromatic effects created.

Before use in the final application, the slabs of artificial agglomerated stone are cut-to-size, whereby the chromatic effects created are visible through the slab thickness in the edges of the cut pieces.

FIG. 7 shows an embodiment of the indenter (7) for creating a cavity in a first layer (1.1) of first mixture, e.g., as the central cavity shown in FIG. 2. For example, as shown in FIG. 7, the indenter (7) is a wheel-shaped indenter shaped as two frustums (7.1) of right cones joined by their bases, such shape provides to the indenter (7) a maximal wheel outer diameter D at the location of the junction of the frustums (7.1). In this configuration, the rotation axes Y-Y' coincides with the frustum (7.1) axes.

In some embodiments, the maximal width size T of the wheel-shaped indenter (7) is suitably selected corresponding to the maximal width of the at least one cavity to be achieved in the first layer.

In some embodiments, the width T of the wheel-shaped indenter (7) might range from 20 mm to 120 mm, or 30 mm to 110 mm. Also, the maximal outer diameter D of the wheel-shaped indenter (7) might range from 100 mm to 300 mm, or 150 mm to 250 mm.

The invention claimed is:

1. A method for manufacturing a slab of artificial agglomerated stone comprising:
    a) depositing a first layer of a first mixture onto a surface, wherein the first layer has a first thickness $h_1$,
    b) creating at least one cavity, having a width $w_i$ and a length $L_i$, in the first layer, wherein the at least one cavity is defined by at least one cavity wall extending at least partially through the first thickness $h_1$ of the first layer and comprising a first wall portion and a second wall portion in opposition through the at least one cavity width $w_i$,
    c) depositing a second mixture into the at least one cavity of the first layer, forming a second layer by depositing the first mixture and second mixture, wherein the second layer has a second thickness $h_2$,
    d) compacting and hardening the second layer,
wherein the method further comprises after step c) and before step d),
    inserting a first tool at least partially into the second thickness $h_2$ of the second layer, and
    rotating the first tool around an axis X-X' essentially parallel to the second thickness $h_2$ of the second layer, wherein the first tool is configured to stir the first wall portion while not stirring the second wall portion, and therefore, the stirring produced by the first tool being rotated while inserted in the second layer transfers the first mixture outside of the areas where the cavities were created and transfers the second mixture inside of the areas where the cavities were created.

2. The method for manufacturing slabs of artificial agglomerated stone according to claim 1, wherein the first mixture and/or the second mixture comprises from 80 weight percent to 95 weight percent of an inorganic filler and from 5 weight percent to 20 weight percent of a hardenable binder.

3. The method for manufacturing slabs of artificial agglomerated stone according to claim 2, wherein the inorganic filler of the first mixture and/or the second mixture comprises from 5 weight percent to 50 weight percent of silicate glass, translucent synthetic silicate, or mixtures thereof.

4. The method for manufacturing slabs of artificial agglomerated stone according to claim 2, wherein the hardenable binder is a translucent organic resin.

5. The method for manufacturing slabs of artificial agglomerated stone according to claim 2, wherein the hardenable binder is a translucent unsaturated polyester resin.

6. The method for manufacturing slabs of artificial agglomerated stone according to claim 1, wherein the first mixture and the second mixture have different composition or different inorganic filler particle size distribution or both.

7. The method for manufacturing slabs of artificial agglomerated stone according to claim 1, further comprising in between steps b) and c), applying a first pigment composition to the at least one cavity wall of the at least one cavity.

8. The method for manufacturing slabs of artificial agglomerated stone according to claim 1, wherein the at least one cavity is defined by: a width $w_i$ varying along the length $L_i$ of the at least one cavity, a width $w_i$ varying along the first thickness $h_1$ of the first layer, or varying along both the length $L_i$ and the first thickness $h_1$ of the first layer.

9. The method for manufacturing slabs of artificial agglomerated stone according to claim 1, wherein the at least one cavity width $w_i$ ranges from 0.03 m-1 m.

10. The method for manufacturing slabs of artificial agglomerated stone according to claim 1, wherein the at least one cavity length $L_i$ ranges from 0.01 m-3.5 m.

11. The method for manufacturing slabs of artificial agglomerated stone according to claim 1, wherein, during step b), the at least one cavity in the first layer is created by a template.

12. The method for manufacturing slabs of artificial agglomerated stone according to claim 1, further comprising, during step b), creating the at least one cavity in the first layer by a wheel-shaped indenter.

13. The method for manufacturing slabs of artificial agglomerated stone according to claim 1, further comprising, during step c), depositing a portion of the second mixture also outside of the at least one cavity.

14. The method for manufacturing slabs of artificial agglomerated stone according to claim 1, wherein the at least one cavity width $w_i$ ranges from 0.05 m-0.5 m.

15. The method for manufacturing slabs of artificial agglomerated stone according to claim 1, wherein the at least one cavity length $L_i$ ranges from 0.1 m-3.3 m.

16. The method for manufacturing slabs of artificial agglomerated stone according to claim 1, further comprising, during step c), depositing a portion of the second mixture also outside of the at least one cavity proximal to the at least one cavity.

17. An artificial agglomerated stone slab comprising at least a first and a second mixtures defining chromatic effects, being manufactured according to the method of claim 1.

18. A plant for the manufacture of artificial agglomerated slabs comprising at least a first and a second mixtures defining chromatic effects, configured for application of the method of claim 1.

* * * * *